UNITED STATES PATENT OFFICE.

PAUL CASAMAJOR, OF BROOKLYN, NEW YORK; LOUISE JANE CASAMAJOR EXECUTRIX OF SAID PAUL CASAMAJOR, DECEASED.

PROCESS OF TREATING SACCHARINE SOLUTIONS.

SPECIFICATION forming part of Letters Patent No. 378,232, dated February 21, 1888.

Application filed June 9, 1887. Serial No. 240,821. (No specimens.)

*To all whom it may concern:*

Be it known that I, PAUL CASAMAJOR, a resident of Brooklyn, Kings county, New York, have invented a new and useful Improvement in Processes of Treating Saccharine Solutions, which improvement is fully set forth in the following specification.

This invention relates to the treatment, for the purpose of purification, of saccharine solutions or juices of preferably low density, and has for its object to accomplish such purification in a more thorough manner than by the methods of treatment now in use. It is customary to treat such solutions with an excess of lime, so as to show a marked alkaline reaction, and afterward to treat them with carbonic acid, which combines with the lime in solution and forms an insoluble precipitate which carries down a portion of the impurities in the saccharine liquid. It is usual to leave the solution alkaline, so that the precipitate formed will not be redissolved. After one such treatment the solution is filtered through a mechanical filter to remove the deposit, and the treatment with lime and carbonic acid is generally repeated. Sometimes a small portion of the lime is precipitated at the first operation, and after filtration another portion is precipitated by further addition of carbonic acid. These processes are called "double carbonations." If the same operation be repeated another time, it becomes a triple carbonation; but in all these processes, no matter how often repeated, it is usual to leave the liquid after the last carbonation more or less alkaline, and filtration over bone-black is depended upon to remove the free lime left in solution. If the last carbonation be carred to such a point as to redissolve a part of the carbonate of lime already formed, this, when afterward filtered through bone-black, leaves a deposit of carbonate of lime, which quickly obstructs the pores of the bone-black.

According to my invention, when a saccharine solution is to be treated with lime and carbonic acid, I proceed, as above, by one or more carbonations, in the usual way, followed by mechanical filtrations. After obtaining a clear solution I add thereto such a quantity of carbonic acid as to precipitate all the lime in solution, and by a further addition of carbonic acid the whole (or a portion) of the precipitate is redissolved. I prefer to redissolve the whole of the precipitate of carbonate of lime, because when this carbonate of lime is subsequently precipitated it will be as a granular precipitate, very easily separated from the liquid by filtration through cloth, instead of as a fine muddy deposit more difficult to remove. To precipitate the carbonate of lime held in solution by an excess of carbonic acid, I raise the temperature of the solution until the carbonic acid is driven off, which takes place at a temperature not higher than 175° Fahrenheit; or the carbonic acid can be driven off at a lower temperature by placing the solution in a vacuum-pan. In a vacuum of twenty-eight inches of mercury the carbonic acid will pass off at a temperature of about 125° Fahrenheit.

The process described is best applicable to solutions of a density of 15° Baumé or less, for the reason that when the solution is too thick the driving off of the carbonic acid held in excess does not cause precipitation of the lime as carbonate of lime, but leaves it in the solution, which remains alkaline.

One important result of the process is that after the lime has been removed as an insoluble precipitate, as described, the same amount of bone-black will produce a much greater degree of decoloration than if lime were left in the solution.

I claim—

1. In the purification of saccharine solutions, the improvement consisting in treating the solution, after one or more carbonations and filtrations in the usual way, with an excess of carbonic acid, so as to precipitate the lime in solution, then redissolving the precipitate wholly or in part, and subsequently driving off the excess of carbonic acid, substantially as described.

2. The herein-described process of treating saccharine solutions after one or more carbonations and filtrations, by adding thereto an excess of carbonic acid to precipitate the lime in solution, causing the precipitate to be redissolved by further addition of carbonic acid, driving off the carbonic acid in excess by raising the temperature to the required degree, as specified, and thereby causing the lime to be deposited as an insoluble precipitate, and removing such precipitate by filtration, substantially as described.

In testimony whereof I have signed this specification in the presence of two subscribing witnesses.

PAUL CASAMAJOR.

Witnesses:
J. G. UNDERHILL,
T. V. HILLICOTT.